No. 886,012. PATENTED APR. 28, 1908.
J. T. H. PAUL.
PASTEURIZING APPARATUS.
APPLICATION FILED JUNE 17, 1907.

Witnesses:
Inventor:
John T. H. Paul,

No. 886,012. PATENTED APR. 28, 1908.
J. T. H. PAUL.
PASTEURIZING APPARATUS.
APPLICATION FILED JUNE 17, 1907.

Witnesses:

Inventor:
John T. H. Paul,

UNITED STATES PATENT OFFICE.

JOHN T. H. PAUL, OF CHICAGO, ILLINOIS, ASSIGNOR TO E. GOLDMAN & COMPANY, INC., OF CHICAGO, ILLINOIS, A CORPORATION OF ILLINOIS.

PASTEURIZING APPARATUS.

No. 886,012.

Specification of Letters Patent.    Patented April 28, 1908.

Application filed June 17, 1907. Serial No. 379,530.

*To all whom it may concern:*

Be it known that I, JOHN T. H. PAUL, a citizen of the United States, residing at Chicago, in the county of Cook and State of Illinois, have invented a new and useful Improvement in Pasteurizing Apparatus, of which the following is a specification.

This invention relates to improvements in pasteurizing apparatus of the variety in which the substance to be sterilized—beer in bottles, for example—is introduced into a tank containing the sterilizing liquid (more usually water) and is permitted to remain stationary in the liquid while the latter is gradually raised to the sterilizing temperature and maintained thereat for the proper length of time, after which the temperature of the liquid is gradually reduced preparatory to removing the sterilized material from the tank.

The invention involves the employment of a plurality of tanks, or compartments in a single tank, of which at least three are required (though the number may be greater) to enable the sterilizing operation to be practiced continuously, in the sense of being uninterrupted by the removal of material that has been sterilized for introduction of material to be sterilized, by a novel manner of controlling the production of different stages of temperature of the liquid sterilizing medium in the several tanks; and the primary object of my invention is to enable such control to be had from a single point on the apparatus by manipulating a single suitable handle. Certain features of my invention may be used to advantage, however, irrespective of the number of tanks employed, whether one or more.

This invention is also especially adapted for the pasteurization of sauces, catsup, preserves and canned, packed or bottled goods of all kinds, requiring to be sterilized to lend to them the necessary keeping quality, rather than treated with preservative chemicals. For the sterilization of such products, they require to be subjected to a comparatively high temperature—say from 172° F. to 210° F.—for a prolonged period of time, some times for several hours continuously, while the heating up and cooling down of the sterilizing medium should, for the sake of economy in time, be performed in comparatively short periods; and the present apparatus, involving a plurality of tanks or compartments, is peculiarly adapted for such work, because of the aforesaid continuous practice which the apparatus makes possible.

In the accompanying drawings Fig. 11$^a$ shows the same of the overflow-controlling portion of that valve by a section at line G$^1$ on Fig. 1 or Fig. 5.

Figure 1:
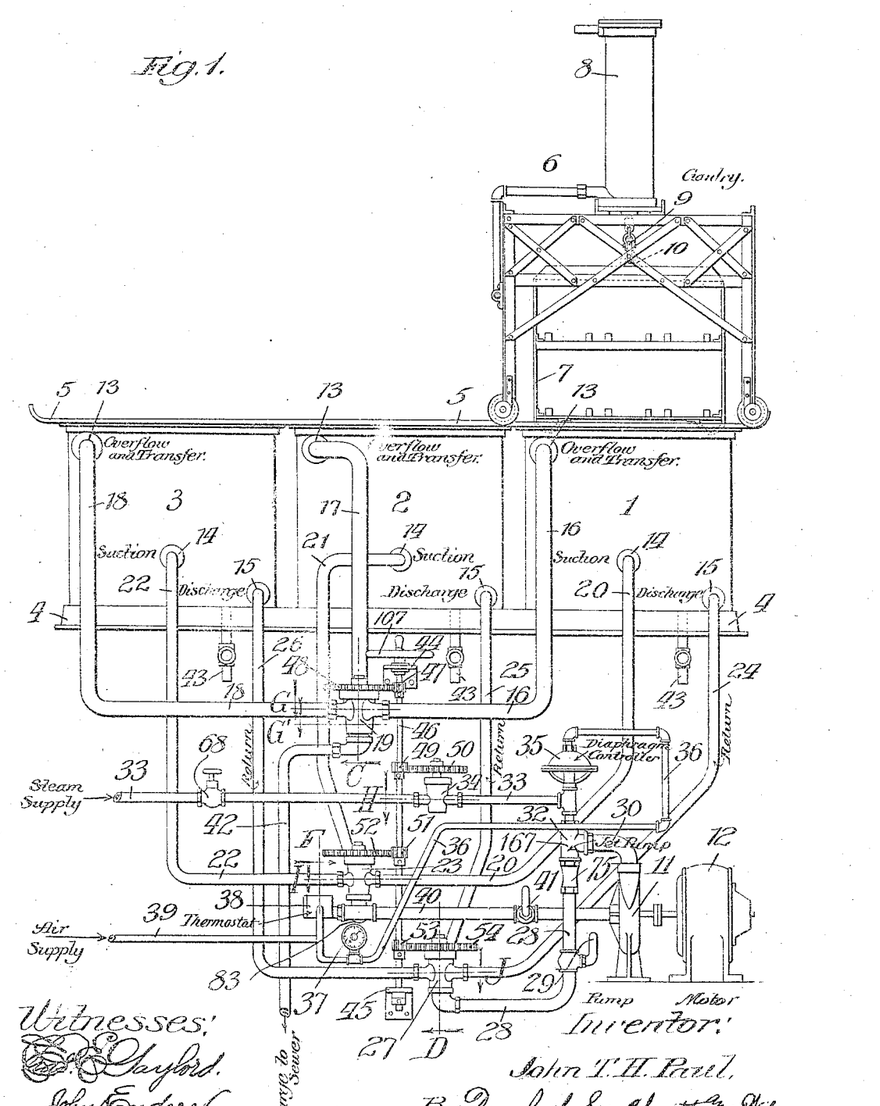
—Figure 1 is a diagrammatic view showing the entire apparatus in elevation.
Figure 2:
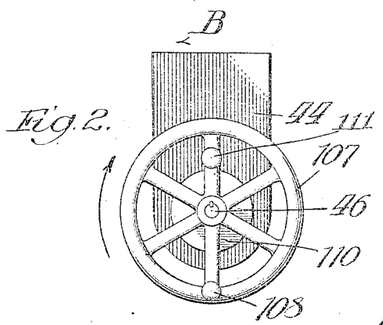
Fig. 2 is a plan view of the valve-operating hand-wheel on its supporting bracket.
Figure 3:
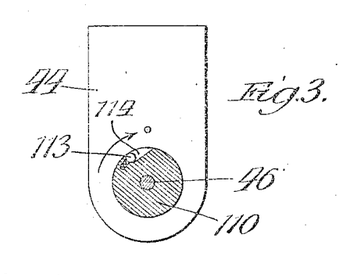
Fig. 3, a section of the same taken at the line A on Fig. 4, showing means for locking the wheel against reverse turning, and Fig. 4, an enlarged vertical section through the hand-wheel, taken at the line B on Fig. 2, showing the valve-operating shaft and one of the four valves geared thereto.

Referring particularly to Fig. 1, three similar tanks, numbered 1, 2 and 3, respectively, are supported in separated relation on a common horizontal base 4 and are surmounted by parallel rails forming a track 5 for a traveling gauntree 6, of any suitable construction. The construction represented is that of a rectangular braced frame on wheels and adapted to receive a two-shelf rack 7, each shelf serving to support a plurality of bottle-containing baskets (not shown); and on the frame is mounted a hydraulic-lift device 8 having a hook 9 suspended from its piston to engage separably with an eye 10 on the rack for lowering and raising it into and out of a tank, in which it fits and with the height of which it corresponds, at least approximately.

It may here be stated that the apparatus shown is more particularly designed for sterilizing beer in bottles by raising the temperature of the water employed to the sterilizing temperature at 140° F., or thereabout; but it will be understood that the invention is not in any sense restricted with regard to the particular substance to be sterilized.

A centrifugal pump indicated at 11 in Fig. 1 is driven by a shaft-connection with a suitable motor, preferably electric, indicated at 12. Owing to the diagrammatic nature of the view selected for illustration in Fig. 1, the pump and motor are represented below the tanks, but it will be understood that they may occupy, in practice, positions on a level with the base 4; and that the various pipe-connections, diagrammatically represented in the figure, may all occupy, with the valves and other mechanism connected with them, space in the plane between the upper and lower ends of the tanks on one side of the latter.

Each tank is provided in one side near its upper end with an opening indicated at 13, which may be termed an overflow and transfer port. Below this opening, in the same side of each tank, is provided an opening indicated at 14, which may be termed the suction-port, because it communicates with the suction-side of the pump. Still lower down in the same side of each tank is provided an opening indicated at 15, which may be termed a return-port, because it communicates with the discharge-side of the pump. From the ports 13 lead, respectively, pipes 16, 17 and 18 to a valve-device 19 involving the construction hereinafter described. From the ports 14 lead the pipes 20, 21 and 22, respectively, to a valve-device 23 involving the construction hereinafter described; and pipes 24, 25 and 26 lead, respectively, from the ports 15 to a valve-device 27 involving the same construction as the valve-device 23. A pipe 28 containing a thermometer 29, communicates through a branch 30 with the pump 11 and contains at 32 a jet-pump device, hereinafter described, above which is connected with it at a T a steam-supply pipe 33 having interposed in it a valve-device 34, hereinafter described. The pipe 28 terminates in a diaphragm-device 35, communicating from above the diaphragm through an air-pipe 36, containing a pressure-gage 37, with a thermostat-device 38, of any suitable construction, such as that hereinafter described. Air under pressure is supplied from a proper source (not shown) to the thermostat-device through a pipe 39. A suction-pipe 40 connects the valve 23 with the pump and contains a thermometer 41. A discharge pipe 42 leads from the valve 19, as to a sewer, and each tank is equipped with a valved draw-off pipe 43, which may lead to the sewer.

Each of the valves 19, 23, 27 and 34 consists, generally stated, of a casing containing a rotary tapering plug-valve provided with ports, the valve 34 being of the straightway variety. Adjacent to these valves is journaled, in a bracket 44 at its upper end and in a bearing 45 at its lower end, a vertical spindle 46. On this spindle are provided a pinion 47 meshing with a gear 48 on the stem of the valve 19, and having a six-to-one diameter relative to the pinion, a pinion 49 meshing with a gear 50 on the stem of the valve 34 and having a four-to-one diameter relative to its pinion, a pinion 51 meshing with a gear 52 on the stem of the valve 23, and a pinion 53 meshing with a gear 54 on the stem of the valve 27. These two last-named pinions are alike, as also are the two last-named gears and have the same relative diameter, namely six-to-one, as the pinion 47 and gear 48.

Figure 5:
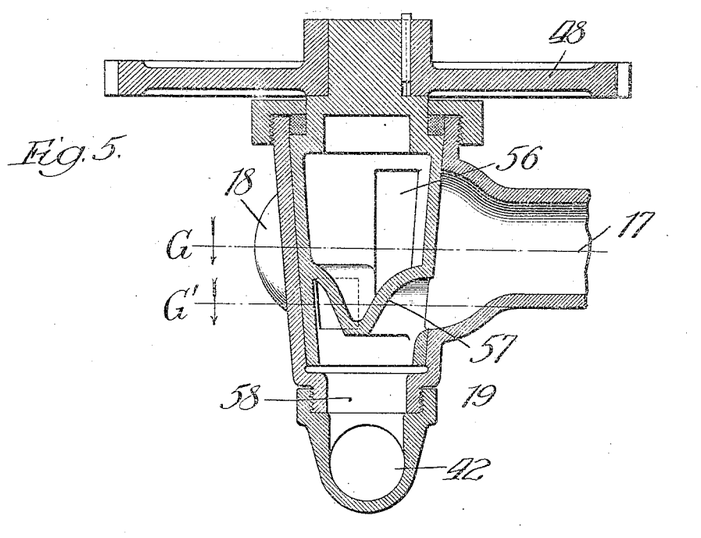
Fig. 5 is an enlarged section taken at the line C on Fig. 1, showing the valve-construction employed for controlling the overflow from, and transfer between, tanks of the sterilizing liquid.
Figure 11:
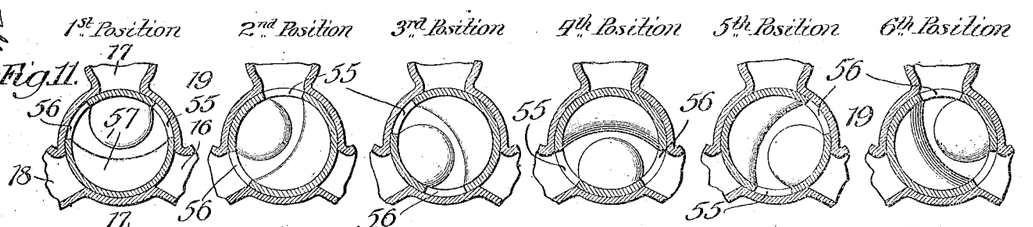
Fig. 11 is a section taken at the line G on Fig. 1 or Fig. 5, showing the transfer-valve by six views, each representing a different position which it assumes in the operation of the apparatus.
Figure 11A:
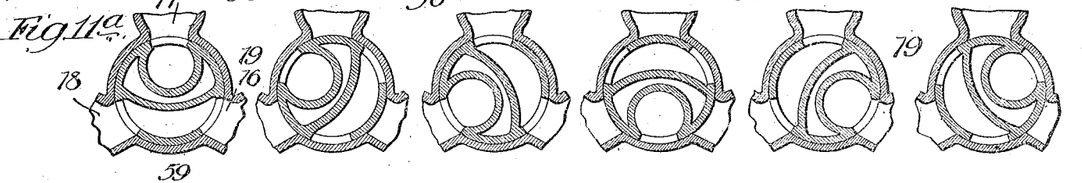

The detailed construction of the valve-device 19 is most clearly shown in Figs. 5, 11 and 11ª. Its rotary hollow plug contains the two lateral ports 55 and 56, a partition 57 in the plane of the points of communication with the valve-casing of the pipes 16, 17 and 18, and a discharge-port 58 in its lower end communicating with the pipe 42.

Figures 12, 13:
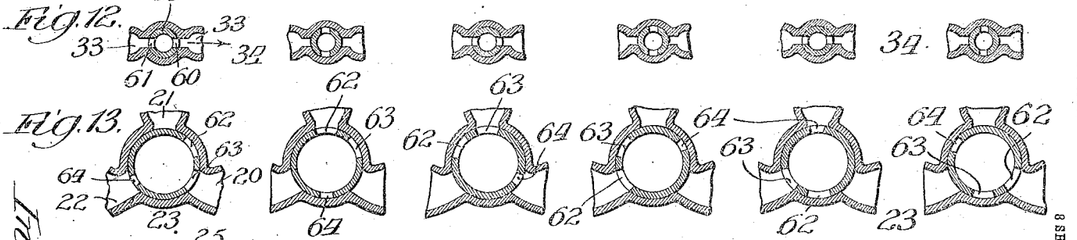
Fig. 12 shows in the same way, by an enlarged sectional view on the line H of Fig. 1, the successive positions assumed by the steam-valve.
Fig. 13 is an enlarged section taken at the line I on Fig. 1, showing the suction-controlling valve by six views, each representing a different position which it assumes in the operation of the apparatus.

The detailed construction of the valve-device 34 is only represented in horizontal section in Fig. 12 as involving a hollow plug 59 having the opposite side-ports 60 and 61 communicating with the casing in which the plug is contained.

Figure 6:
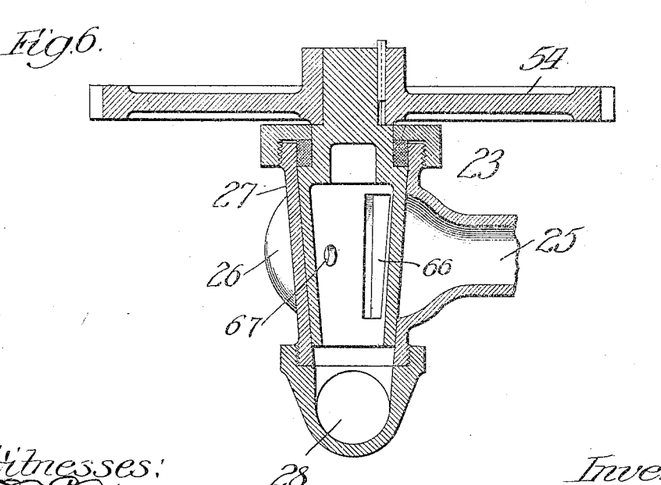
Fig. 6, a similar view on the line D on Fig. 1, showing the valve construction for controlling the liquid discharge from the pump through an external heating device, to a tank, the same construction of valve being employed for controlling the suction to the pump.
Figure 14:
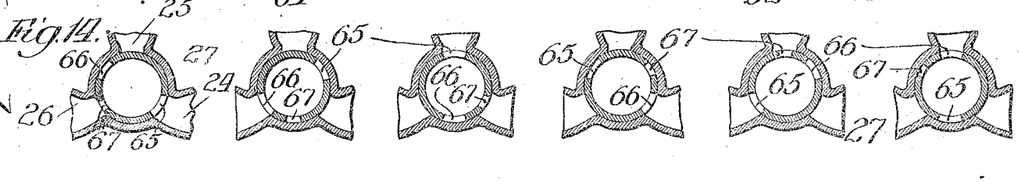
Fig. 14 shows the same with relation to the pump-discharge controlling valve by an enlarged section taken at the line J on Fig. 1.
Figure 15:
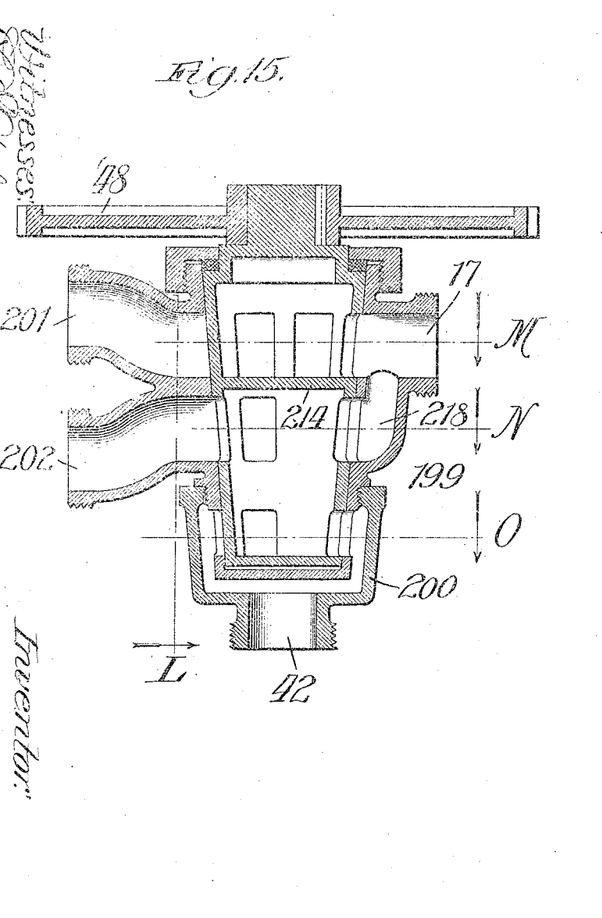
Fig. 15 is a view like that presented in Fig. 5, but showing a modified construction of the valve of that figure, the sections being taken at the line K on Fig. 16, or at the line K through Figs. 17, 18 and 19.

In Figs. 6, 13 and 14 is shown the detailed construction of the valve-devices 23 and 27, the first-named involving the rotary plug in its casing containing the two similar lateral ports 62 and 63, close together, and the smaller lateral port 64, for the purpose hereinafter described, and the last-named having its rotary plug provided with two similar lateral ports 65 and 66 diametrically opposite each other and with the smaller port 67 near the port 66.

Figure 7:
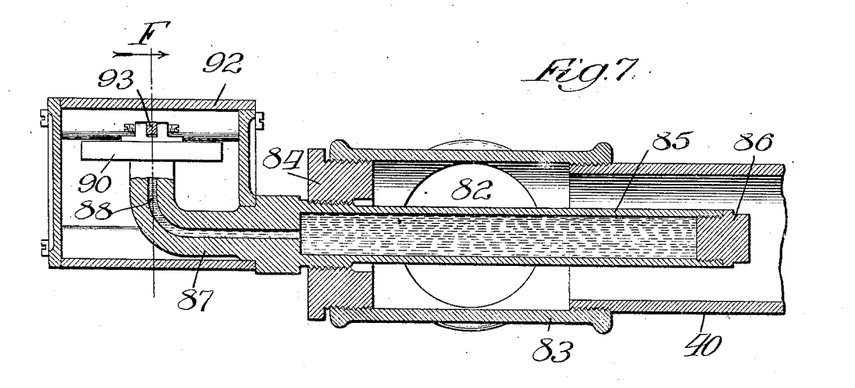
Fig. 7 is an enlarged sectional view on the line E on Fig. 8, showing a preferred construction of thermostat used for controlling the supply of steam for heating the water in its course to the tanks.
Figure 8:
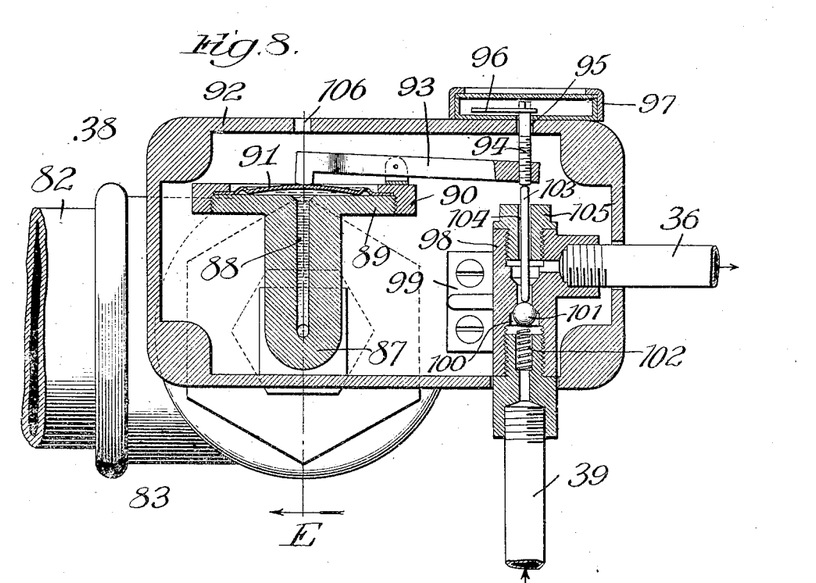
Fig. 8 is a section of the same on line F of Fig. 7 or Fig. 1.
Figures 9, 10:
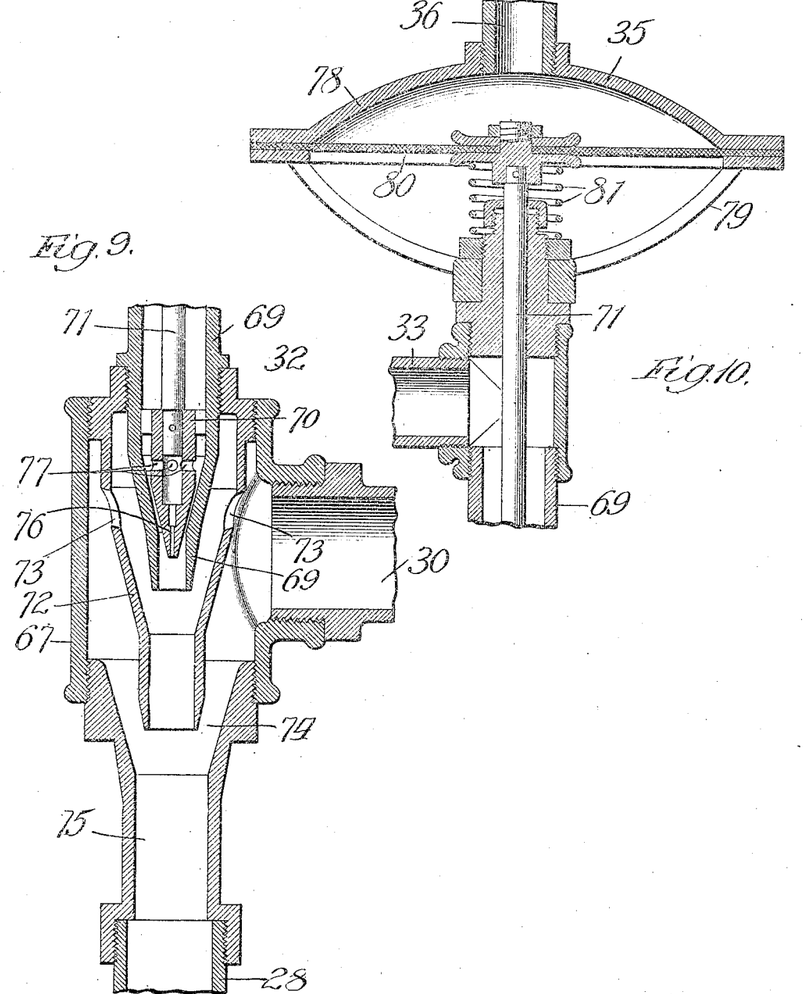
Fig. 9 shows by a broken view in sectional elevation the preferred construction of jet-pump employed for heating the sterilizing liquid on its way to the tanks.
Fig. 10 shows by a similar view the construction for operating the steam-valve of the jet by air-pressure controlled by the thermostat, this view being a continuation of Fig. 9.

The jet-pump device 32, shown in detail in Figs. 9 and 10, comprises the following-described construction: Into the T-coupling 167 connecting the steam-pipe 33, which contains a shut-off valve 68, with the pipe 28, is projected a downwardly-tapering nozzle 69, in which seats a correspondingly shaped plug-valve 70 pinned on a vertical reciprocable stem 71. Within the coupling 167 is supported about the nozzle a mixing-chamber 72, of a generally tapering shape, containing lateral inlet-ports 73, and discharging into a downwardly tapering mixing-chamber 74 on the lower end of the casing in a tubular connection 75 thereof with the pipe 28. The valve 70 contains a central discharge-opening 76, of small bore, extending through its lower end from near its transverse center, where ports 77 are provided to adapt the bore to have open communication with the interior of the nozzle 69, whereby a relatively small quantity of steam may always leak through the valve, even when it is seated. The nozzle 69 terminates at its upper end in a diaphragm-device 35, consisting of a casing 78 supported on arms 79 extending from the nozzle and having its base formed of a flexible diaphragm 80 centrally to which is fastened the valve-stem 71 having confined about it a spiral spring 81 tending to raise the valve 70 from its seat by raising the diaphragm, upon reducing the air-pressure against the upper side of the latter. Interposed between the air-pipe 36 which leads from the diaphragm-chamber, and the air-supply pipe 39, is the thermostat-device 38 shown in Figs. 7 and 8 to involve the following construction: The valve 23 is connected from the lower end of its casing through a pipe 82 (Fig. 8), by means of a suitable coupling 83, with the pipe 40, which leads to the pump. In a reducer 84 screwed into one end of the T-coupling 83 is screwed the thermostat proper, consisting of a tube 85 closed at one end as by a plug 86, and adapted to contain a fluid, such as ether, that will expand and contract under variations in temperature, this tube terminating at its opposite end in a goose-neck 87 containing a reduced bore 88, and ending in a disk-shaped head 89 upon which is secured, by a ring-nut 90 screwed upon the disk, a diaphragm 91, to the center of which the bore in the gooseneck opens. This goose-neck end of the thermostat enters a casing 92 in which is fulcrumed on the ring 90 an angular lever 93 bearing at one end against the center of the diaphragm 91 and having a threaded vertical opening in its opposite end to receive a screw 94 passing through an opening 95 in the casing, beyond which it carries a dial-finger 96 within the casing 97 of a suitable dial, for the purpose hereinafter explained. Within the casing 92 the air-supply pipe 39 and air-conducting pipe 36 leading to the diaphragm-device 35, are coupled together by a head 98 having a bracket-extension 99, at which it is screwed to an inner wall of the casing. The head 98 contains a valve-chamber 100 in which is housed a ball-valve 101 supported on a spring 102 in the passage leading from the end of the pipe 39 in the head, and a plunger-rod 103, passing through a relatively wide bore 104 in a plug 105 screwed into the upper end of the head, bears at one end against the ball-valve and coincides at its opposite end with the screw 94. By means of this thermostat-device, when water passing through the pipe 40 attains a certain predetermined temperature, the heat, by expanding the fluid in the tube 85, causes it to raise the diaphragm 91, thereby actuating the lever 93 to depress the screw 94 against the plunger 103, and open the valve 101. Thus opening the valve admits air-pressure from the pipe 39 to the pipe 36, through which it acts against the diaphragm 80 to depress the rod 71 and seat the valve 70, thereby shutting off the steam-supply for heating the water, as hereinafter described, until the water in the pipe 40 is properly lowered in temperature to contract the thermostat-fluid and permit consequent lowering of the diaphragm 91 to be followed by the contacting end of the lever 93 under the recoil-action of the spring 102 to raise the ball 101 against its seat and shut off the air-supply to the pipe 36. Thereupon the air under pressure against the diaphragm 80 escapes by way of the pipe 36 through the opening 104 about the plunger 103 working in the plug 105, and discharges through a vent-opening 106 in the casing 92, with the result that the spring 81 is freed to restore the diaphragm 80 to its normal position of opening the valve 70 for resuming the flow of steam.

By screwing the adjusting-screw 94 into the lever 93 to raise the adjacent end thereof, the opposite end of the lever is pressed against the diaphragm 91 to adapt it to turn the lever under a lesser force of expansion of the thermostat-fluid, and thus to shut off the steam-supply at a lower temperature of the water in the pipe 40; and, obviously, by turning the screw in the opposite direction, a higher temperature of the thermostat-fluid will be required to effect opening of the valve 101. The dial-device 97 may be set for shutting off the steam at any desired temperature by removing the cover with which it is shown to be provided in Fig. 8 (and which should be transparent) to permit access to the finger for turning it to work the screws 94 and for setting the finger with relation to a suitable gage (not shown) marked on the dial over which the finger moves to indicate the predetermined temperature for the run of the apparatus.

Figure 4:
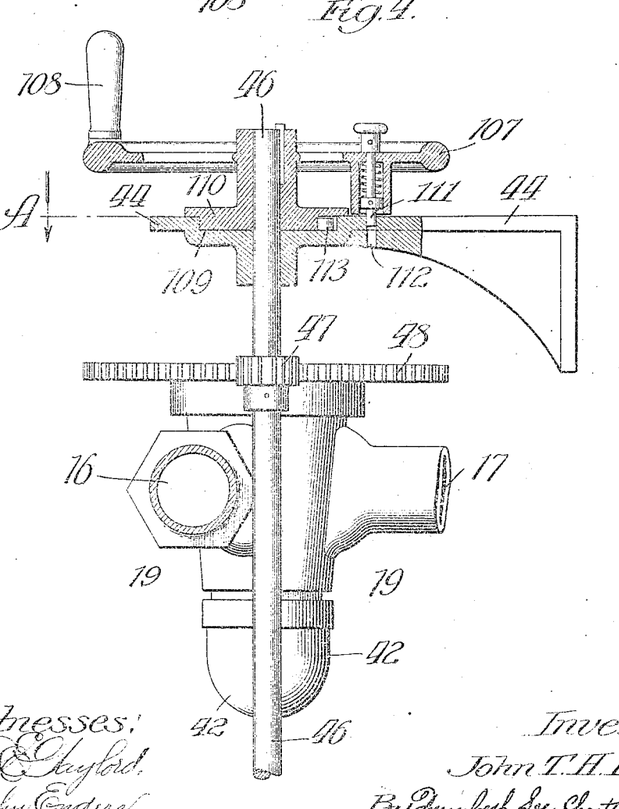

The spindle 46, which works the different geared valves of the apparatus as and for the purpose hereinafter described, carries on its upper end a hand-wheel 107 equipped with a crank-handle 108. The bracket 44 forming the upper bearing for the spindle contains a circular recess 109 (Fig. 4) in its upper face to afford a bearing for the flanged disk-like head 110 on the hub of the hand-wheel. Diametrically opposite the handle 108 is provided, in the wheel 107, in a housing depending from it, a spring-pressed plunger-rod 111 adapted to register with a socket 112 in the bracket 44 in each complete revolution of the spindle, to lock the hand-wheel against making more than a complete turn, by engagement of the pin 111 with its retaining-socket, and requiring the pin to be raised preliminary to each operation of the spindle. Moreover, it is important for reasons which will be apparent from the description of the operation, hereinafter contained, that reversal of the turning of the spindle shall be prevented. To accomplish this purpose, a suitable clutch-device is provided, that shown being of well-known construction consisting of a spring-pressed roller 113 confined in a recess 114 provided in the disk-head 110, with its lower end bearing against the base of the recess 109, whereby any attempt to turn the hand-wheel backward will crowd the roller against the wall of the recess and bind the hub-disk, which is keyed to the spindle, against reverse turning.

The operation is as follows: The tanks 1, 2 and 3 are filled with cold water up to the ports 13 introducing the water, as by means of a hose, through the tops of the tanks. Each tank has stored in it, as a suitable place of storage, because thereby taking up other storage-room is avoided, a rack 7. The gauntree is moved on its track 5 over the tank 1 and operated to lower the hook 9 therein for coupling it with the rack in that tank, when the gauntree is operated to elevate the rack out of the tank to enable it to be filled with baskets of bottles containing beer to be pasteurized. At the beginning, all the parts occupy the relative positions in which they are illustrated, the geared valves being then as represented in the vertical column on sheet 6 under the heading "1st position". That is to say, the upper or "transfer" port of the valve 19 is closed to the pipes 16, 17 and 18, the lower or "overflow" portion of the valve is open to these pipes; the steam valve 34 opens the pipe 33; the valve 23 is closed to the pipe 21 but open to the pipes 20 and 22; and the valve 27 is closed to the pipe 25 but open to the pipes 24 and 26. It may be stated here that the most desirable position for these pipes 16, 17 and 18 and the valve 19 is in horizontal alinement with the ports 13 to produce a level flow in the transferring of water in one tank to another into the top thereof for the purpose hereinafter described. After the rack has been lowered by the gauntree into the first tank, the water in which is to be heated, and the gauntree has been released from that rack and its hook 9 raised, the operator turns on steam by opening the valve 68. Thus live steam courses through the pipe 33, valve 34 and jet-pump 32. Meantime, the pump 11 is started to suck a relatively small quantity of water from the tank 3 through the pipe 22 and small port 64 in valve 23, whence it discharges through the end-port in this valve into pipes 82 and 40 to enter the pump. The water sucked by the action of the pump in relatively larger quantity through the pipe 20 enters the valve 23 at its port 63 and also discharges to the pipes 82 and 40 to enter the pump, whence it enters the steam-jet device by way of the pipe 30 and encounters the steam, mixing thoroughly therewith in the chambers of the jet-device and becoming heated. The heated water then passes through the connection 75 and pipe 28 into the valve 27 through its end-port, escaping from that valve in relatively large quantity through the port 65 and pipe 24 to return to the tank 1, and through the port 67, in relatively small quantity, to enter the tank 3 by way of the pipe 26. This action is maintained throughout a period sufficient to heat the water in the tank 1 to the sterilizing temperature, which is 140° F., the time consumed being about twenty minutes; and this condition is maintained for an additional period of about thirty minutes. The heated return-water which enters the tank 3 preliminarily heats the water in that tank, though this preliminary heating is a mere incident, occurring because of the provision of the small port in the valve, which serves another purpose hereinafter explained. While so heating the tank 1, the gauntree is moved over tank 2 and the rack therein raised and filled and lowered back into that tank.

At the end of the twenty-minute period above referred to, the operator raises the pin 111 to free the wheel 107, which he then rotates through a complete turn, revolving the valves 19, 23 and 27 through one-sixth of a revolution and the valve 34 through one-fourth of a revolution, thereby turning these valves to the positions represented in the vertical column headed "2nd position". Thus the steam-supply is shut off through the valve 34, the valve 19 is opened to the pipes 17 and 18 with its lower part closed to the overflow, the valve 23 is opened to the pipe 21 and the valve 27 is opened to the pipe 26 with the following results: The water preliminarily heated in the tank 3 flows therefrom through the level pipe 18, valve 19 and pipe 17 upon the water in the tank 2, from the lower part of which the colder water in the tank is sucked by the pump through the pipe 21, valve 23 and pipes 82 and 40, and discharged through the pipe 30 into the jet-device 32, whence, by way of the pipe 28, it enters the valve 27 to be discharged through the pipe 26 into the tank 3 at the base thereof. This action consumes a period of about five minutes, during which the sterilizing temperature in tank 1 will not be materially reduced. As soon as this transfer from tank 3 to tank 2 is completed, the hand-wheel is again turned through a complete revolution to bring the geared valves to the position represented in column 3, headed "3rd position", with the following results: The valve 19 is closed to the pipes 16, 17 and 18, thereby shutting off the transfer between the tanks 2 and 3 and opening the three tanks to the overflow to permit any increase of level in the tanks, due to the condensed steam, to run into the sewer; the steam-valve 34 is opened to the jet-pump; the valve 23 is closed to the pipe 22, but open to the pipe 21 to permit the pump to suck the contents of tank 2 and heat the same in the jet-device, whence the heated water passes through pipe 28 and valve 27 into pipe 25 to enter the bottom of tank 2 and heat the water therein to the pasteurizing temperature, some of this heated water passing through port 67 and pipe 24 into the bottom of tank 1 to maintain the water therein at the sterilizing temperature, and meantime the action of the pump takes as much water as is added to the contents of tank 1 by the heating water introduced into it through the port 64 and pipe 20, whence it again enters the pump. This operation also consumes a period of about twenty minutes. Meantime the gauntree will have been moved over tank 3 to raise the rack therein to be filled with bottles and lower the filled rack into the tank. At the end of this period of twenty minutes, when the water in the tank 2 has reached the pasteurizing temperature, another complete turn of the hand-wheel is made, thereby bringing the geared valves to the position represented in the fourth column headed "4th position", with the following results: The water in tank 1 is transferred into the top of tank 3, the overflow from both these tanks is shut off, valve 34 is closed, valve 23 is opened to pipe 22 to cause the pump to suck the cold water from tank 3 and introduce it to the steam-jet device, and valve 27 is opened to pipe 24, whereby this heated water enters the lower port in valve 27 and passes therefrom through pipe 24 into the bottom of tank 1 to cool the water therein, after the beer in that tank has been sterilized, down to the temperature at which the bottles may be removed without danger of fracturing them. This operation consumes a period of about five minutes, and the water in tank 3 has next to be heated to the sterilizing temperature, while maintaining the water in tank 2 at that temperature. These functions ensue from another complete turn of the hand-wheel to bring the geared valves to the positions represented in the fifth column, headed "5th position", whereby the following-described conditions are produced: The valve 19 is closed to the pipes 16, 17 and 18, while it is open to the overflow through those pipes; the steam-valve 34 is open; valve 23 is open to the pipe 22 to permit the pump to suck the cold water from tank 3 through pipes 82 and 40 into the steam-jet device; and valve 27 is open to pipe 26 to permit the water thus heated to return through pipe 26 to tank 3 for raising the water therein to the sterilizing temperature, a portion of this heated water passing through the smaller port in valve 27, by way of the pipe 25, into tank 2 to maintain the water in the latter at the required temperature of 140° F.

While tank 3 is being heated, the gauntree is being manipulated to raise the rack out of tank 1, permit the pasteurized beer to be taken out, and permit the rack to be refilled with bottles of unpasteurized beer and lowered into that tank. When the temperature in tank 3 has been raised to that required for sterilizing, consuming a period of about twenty minutes, the operator again makes a complete rotation of the hand-wheel, thereby bringing the geared valves to the positions represented in the sixth column headed "6th position", with the following-described results: The valve 19 is open to pipes 17 and 16 to permit the transfer of the hot water in tank 2 to the top of the cold water in tank 1, the overflow through this valve being shut off, and the steam-valve 34 being closed; valve 23 is open to the pipe 20 to permit the cold water in tank 1 to be sucked by the action of the pump through the steam-jet device (but, of course, without heating the water), and the valve 27 is open to the pipe 25 to take the water from tank 1 into the bottom of tank 2 for cooling that tank down to the proper temperature for removing therefrom the bottles of pasteurized beer. This operation consumes a period of about five minutes, at the end of which another complete turn of the hand-wheel brings the geared valves to "1st position", thereby closing the transfer-valve between the tanks 1 and 2 and opening the overflow ports of that valve, as also opening the steam-valve to the jet-pump and the suction-valve 23 and delivery-valve 27 for circulating the water in tank 1 out of and into the same and gradually heating it to the pasteurizing temperature, as described of the first operation, which is thus repeated.

The successive operations of the hand-wheel for producing the six different positions of the geared valves may be repeated as often as required for completing a run of the apparatus on a quantity of the material to be sterilized, and at the end of the run the water in each tank may be drawn off into the sewer on opening the valves in the pipes 43, though the water in the tanks may be used over and over again, during weeks, without changing.

From the foregoing description of the mechanism and its operation, it will be readily understood that the sterilizing procedure is rendered continuous, in the sense of maintaining all of the tanks employed in uninterrupted use for conducting simultaneously in them different steps of the process, though when a greater number of tanks than three is employed, the same step of sterilizing, heating to the sterilizing temperature, or cooling the sterilizing liquid, may be practiced simultaneously in each of two or more of the tanks, without departing from the principle of the operation of the described apparatus. It will be apparent, moreover, that the operation consists, generally stated, in circulating the water in each tank in succession, beginning with any one, out of that tank through an extraneous heater and back into the same tank to raise the liquid gradually to the sterilizing temperature, utilizing the heated water of one tank after it has performed its sterilizing function therein, (during which it is maintained at the proper temperature by introduction into it through the heater of a relatively small quantity of water from another tank) through a valve port 67 to displace the colder water in another tank to preliminarily heat the bottles therein, from which last-named tank such colder water is meantime transferred to the tank in which the sterilizing was performed, for cooling the bottles. All of these operations are performed by mere turning of the hand-wheel, which can not be turned too far or reversed to disorganize the action of the apparatus, and the operation is rendered simple and reliable. By utilizing the hot water from each tank to gradually descend upon the cold bottles in another tank for preliminarily heating them, the advantage of economy ensues; and this advantage is greatly enhanced by heating the water for raising that in each tank to the sterilizing temperature, extraneously of the tank, since thereby the heating is rendered uniform instead of stratifying the heat through the water, which is thus reduced to a condition to adapt it to gradually raise the temperature in the tank to that required for sterilizing and avoid or greatly reduce the danger of breaking the bottles. The stratification referred to would result from injecting steam directly into the tanks, and even the provision of steam-coils in the tanks for heating the water would not effect the desired uniform heating thereof. These objections are completely avoided by the action of the jet-pump in thoroughly mixing the steam with the water, which a mere steam-jet would not accomplish because of its heat-stratifying tendency. Moreover, tendency to stratification of the heat in a tank at the sterilizing temperature, is prevented by the continued circulation therein through the medium of the supply of heated water which is introduced into that tank through a small valve-port, as hereinbefore described.

While the steam-jet device might be used to the exclusion of the pump, it would require too great pressure to be economical, so that it is preferred to supplement its action by that of the pump.

Figure 16:
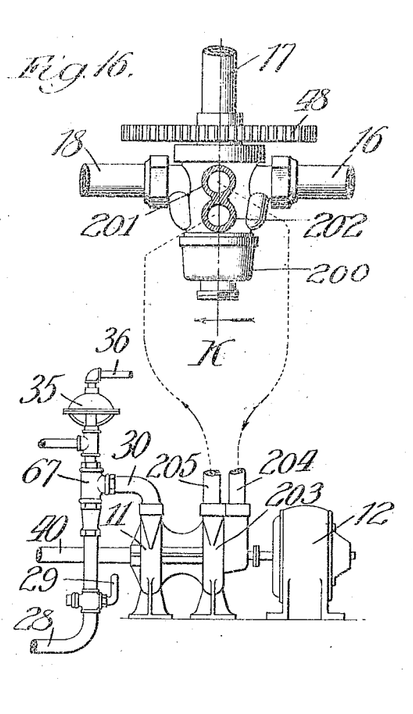
Fig. 16 is a view in the nature of a diagram, showing this same valve, by a reduced section taken at the line L on Fig. 15, and a supplemental centrifugal pump communicating with the valve to produce, by pumping instead of gravity-flow, the transfer of the sterilizing water from one tank to another.
Figure 17:
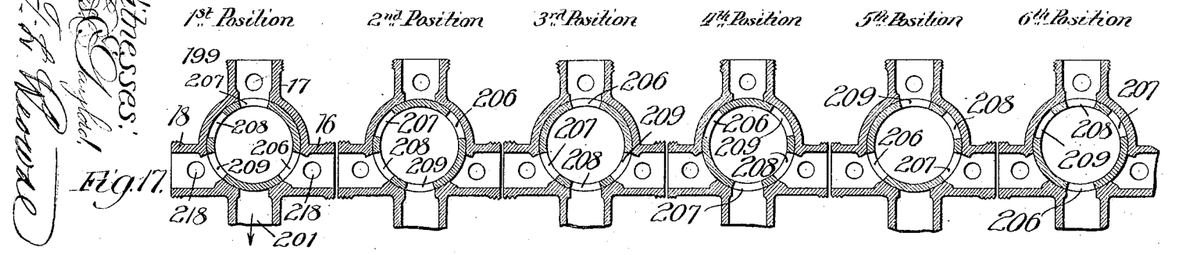
Fig. 17 is a view like that presented in Fig. 11, being a section taken at the line M on Fig. 15, showing the six different positions assumed by the upper portion of the transfer-valve of Fig. 15 in the modified operation of the apparatus.
Figure 18:
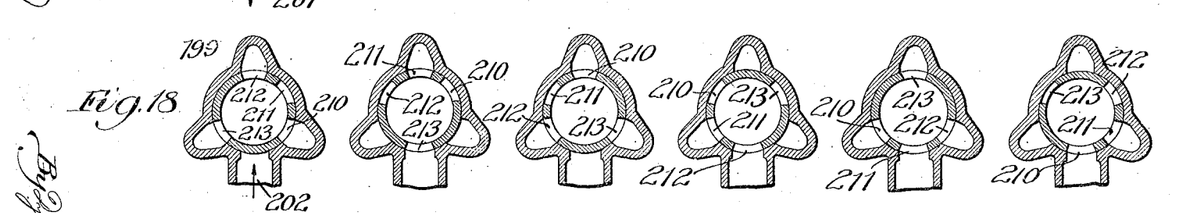
Fig. 18 shows the same of the intermediate portion of the modified transfer-valve, the section being taken at the line N on Fig. 15.
Figure 19:
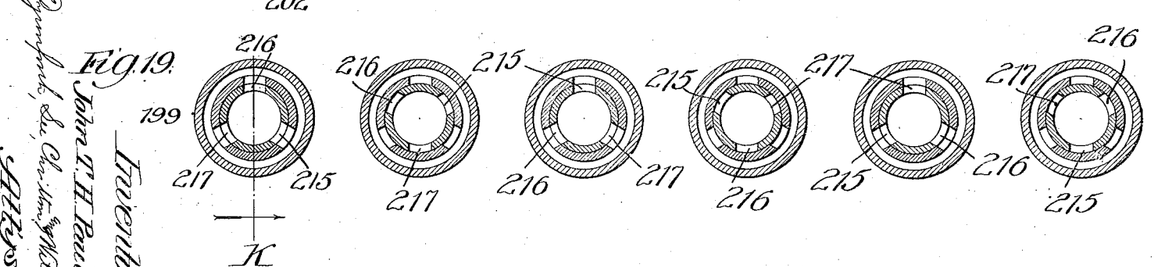
Fig. 19 shows the same, by a section taken at the line O on Fig. 15, of the lower, overflow-portion of the modified valve.

As will be realized, in providing, as herein described, for the transfer from one tank to another of the sterilizing-water by mere flow, unless the pipes through which such flow takes place are of adequately large diameter, the flow is undesirably slow. To avoid the use of such large pipes the flow may be expedited through suitable narrower ones by the modified construction illustrated in Figs. 15 to 19, inclusive, of which the following is a description: The valve 19 is supplanted by a valve 199 carrying the gear-wheel 48 to mesh with the pinion 47 on the operating-stem 46. The casing of this valve 199, shown with a bonnet 200 forming its lower end to which the sewer-pipe 42 leads, has the pipes 16, 17 and 18 connected with it, and is provided in the plane between the pipes 16 and 18, with an upper nozzle 201 and a similar lower nozzle 202 at which to connect a centrifugal pump 203, like the pump 11 and also on the shaft of the motor 12, the connection being made of the nozzle 201 with the suction-side of the pump 203 through a pipe 204 (Fig. 16) and of the nozzle 202 with the discharge-side of that pump through a pipe 205. The rotary tapering plug of this modified valve has an upper section containing the four ports 206, 207, 208 and 209, with which section the nozzle 201 registers, an intermediate section with which the nozzle 202 registers, containing the four ports 210, 211, 212 and 213, this section being divided from the upper section by a horizontal partition 214, and a lower, overflow-section having ports 215, 216 and 217 adapted to register with similar ports in the casing, open to the bonnet 200. At each junction with the casing of a pipe 16, 17, 18 a passage 218 leads from such connection in the casing to ports in the intermediate section of the valve-device with which the ports in that section of the plug-valve are adapted to register. With this modified construction in use, the operation becomes the following in transferring the water from one tank to another: The pump 203 being on the same motor-shaft with the pump 11 is, like the latter, in continuous motion under the working of the motor 12, though, obviously, neither pump produces circulation through "transfer" pipes 16, 17, 18 when the valve to which they are connected shuts off their intercommunication, as in the first, third and fifth positions in Fig. 11 and in Fig. 17. With the valve 199 in the condition represented in Figs. 17, 18 and 19 in the column headed "1st position", as also in the third and fifth positions, no circulation ensues through the transfer-pipes because the valve shuts off communication between the nozzles 201 and 202 (pipes 205 and 204), though the overflow-section of the valve is open; while in the "2nd position" of the valve, wherein its overflow-section (Fig. 19) is closed, the port 213 registers with the pipe 205 (nozzle 202), its port 211 with the pipe 17, its port 209 with the pipe 204 (nozzle 201) and its port 208 with the pipe 18, thereby permitting the action of the pump 203 to transfer the water from tank 3 through pipes 18, 204, and the pump and thence through the pipe 205, ports 213 and 211 and pipe 17 into the tank 2. With this valve in the "4th position", the pump 203 transfers the water from tank 1 through pipe 16, ports 208, 207 and pipe 204, and through pipe 205, ports 212 and 211 and pipe 18 into tank 3; and in the "6th position" of the valve, the pump transfers the water from tank 2 through ports 208 and 209 and pipe 204, and through pipe 205, ports 210, 211 and pipe 16 into tank 1.

What I claim as new, and desire to secure by Letters Patent, is:

1. In a pasteurizing apparatus, the combination with a plurality of tanks for the sterilizing liquid in each one of which the complete pasteurization is effected, of a system of pipes communicating with all said tanks, and valves in said pipes for controlling the flow of the liquid from any tank to any other tank, whereby the temperature of the liquid in one tank is raised, the temperature of the liquid in another tank kept substantially stationary, and in a third tank reduced.

2. In a pasteurizing apparatus, the combination with a plurality of tanks for the sterilizing liquid in each one of which the complete pasteurization is effected, of a series of inlet pipes one for each tank, said series having a common valve, and a series of outlet pipes one for each tank, said series having a common valve whereby the flow of the liquid is controlled.

3. In a pasteurizing apparatus, the combination with a plurality of tanks for the sterilizing liquid in each one of which the complete pasteurization is effected, of a system of pipes communicating with all of said tanks, valves in said pipes for controlling the flow of the liquid from any tank to any other tank and a heating device in said system, said parts operating so that the temperature of the liquid in one tank is raised while the temperature of the liquid in another tank is kept stationary, and in a third tank reduced.

4. In a pasteurizing apparatus, the combination with a plurality of tanks for the sterilizing liquid in each one of which the complete pasteurization is effected, of a system of pipes communicating with all of said tanks, valves in said pipes for controlling the flow of the liquid, and connections between said valves adapting them to be simultaneously set by a single operation, said parts operating so that while the temperature of the liquid in one tank is being raised the temperature of the liquid in another tank is kept substantially stationary, and in a third tank reduced.

5. In a pasteurizing apparatus, the combination with a plurality of tanks for the sterilizing liquid in each one of which the complete pasteurization is effected, of a system of outflow and return pipes through which said tanks intercommunicate valves in said pipes for controlling the flow of liquid from any tank to any other tank, a pump and heater in said pipe system, said parts being adapted and arranged so that while the temperature of the liquid in one tank is being raised the temperature of the liquid in another tank is held substantially stationary, and in a third tank reduced.

6. In a pasteurizing apparatus, the combination with a plurality of tanks for the sterilizing liquid in each one of which the complete pasteurization is effected, a system of outflow and return pipes through which said tanks intercommunicate valves in said pipes for controlling the flow of liquid from any tank to any other tank, a liquid heating steam jet pump in said pipe, said parts being so constructed and arranged that while the temperature of the liquid in one tank is being raised the temperature of the liquid in another tank is kept substantially stationary, and in a third tank reduced.

7. In a pasteurizing apparatus, the combination of a plurality of tanks for the sterilizing liquid, a system of outflow and return pipes extraneous of the tanks, through which they intercommunicate, a pump and a heater in said pipe-system, rotary valves in the pipes, and non-reversible gear-connections between the valves operative from a single point on the apparatus to simultaneously set the several valves for controlling the flow of the liquid to and from the tanks.

8. In a pasteurizing apparatus, the combination of a plurality of tanks for the sterilizing liquid, a system of outflow and return pipes extraneous of the tanks, through which they intercommunicate, a pump and heater in said pipe-system, valves in the pipes, and an operating spindle on the apparatus having gear-connections with the valves for simultaneously turning and thereby setting them to control the flow of the liquid to and from the tanks.

9. In a pasteurizing apparatus, the combination of a plurality of tanks for the sterilizing liquid, a system of outflow and return pipes extraneous of the tanks, through which they intercommunicate, a pump and heater in said pipe-system, valves in the pipes, an operating spindle rotatably supported on the apparatus, having gear-connections with the valves for simultaneously turning them and thereby setting them to control the flow of the liquid to and from the tanks, and a clutch-device coöperating with the spindle to prevent reverse turning thereof.

10. In a pasteurizing apparatus, the combination of a plurality of tanks for the sterilizing liquid, a system of outflow and return pipes extraneous of the tanks, through which they intercommunicate, a pump and heater in said pipe-system, valves in the pipes, an operating spindle rotatably supported on the apparatus, having gear-connections with the valves for simultaneously turning them, and thereby setting them to change such intercommunication by each complete rotation of the spindle, to control the flow of the liquid to and from the tanks, and a releasable lock for the spindle operating to arrest it at the end of each complete rotation thereof.

11. In a pasteurizing apparatus, the combination of a plurality of tanks for the sterilizing liquid having valved circulating-pipe connections for the liquid, a steam-jet pump in the circulation constructed and arranged to heat the liquid and circulate it simultaneously through said connections in relatively larger and smaller quantities into different tanks.

12. In a pasteurizing apparatus, the combination of a plurality of tanks for the sterilizing liquid, a system of outflow and return pipes through which said tanks intercommunicate, a pump and heater in said pipe-system, and valves in the pipes for opening and closing communication between them and containing ports operating to direct a relatively large quantity of the liquid from the heater into one tank while directing a relatively small quantity thereof into another tank for heating its contents.

13. In a pasteurizing apparatus, the combination of a plurality of tanks for the sterilizing liquid, valve-controlled heating-means for said liquid, transfer-pipes communicating with the tanks, and a valve common to said pipes for controlling the transfer through them of said liquid from one to another of the tanks, said valve having an overflow-section with a discharge-pipe leading therefrom.

14. In a pasteurizing apparatus, the combination of a plurality of tanks for the sterilizing liquid, valve-controlled heating-means for said liquid, transfer-pipes communicating with the tanks, a pump, a valve common to said pipes, and suction and discharge pipes connecting the pump with said valve.

15. In a pasteurizing apparatus, the combination of a plurality of tanks for the sterilizing liquid, valve-controlled heating-means for said liquid, transfer-pipes communicating with the tanks, a pump, a valve common to said pipes, having two sections, one above the other and communicating with each other, and suction and discharge-pipes each connecting the pump with one of said valve-sections.

16. In a pasteurizing apparatus, the combination of a plurality of tanks for the sterilizing liquid, valve-controlled heating-means for said liquid extraneous of the tanks, transfer-pipes communicating with the tanks, a pump, a valve common to said pipes, having inter-communicating upper and intermediate sections and a lower overflow-section, and suction and discharge-pipes respectively connecting the pump with said upper and intermediate valve-sections.

17. In a pasteurizing apparatus, the combination of a plurality of tanks for the sterilizing liquid, valve-controlled heating-means for said liquid extraneous of the tanks, transfer-pipes communicating with the tanks, a rotary-plug valve common to said pipes, having two sections one above the other with a partition separating them and passages in the valve-casing through which said sections intercommunicate, and suction and discharge-pipes each connecting the pump with one of said valve-sections.

18. In a pasteurizing apparatus, the combination of a plurality of tanks for the sterilizing liquid, valve-controlled heating-means for said liquid extraneous of the tanks, transfer-pipes communicating with the tanks, a rotary plug-valve common to said pipes, having an upper and intermediate section with partition separating them and pasthe valve-casing through which said sections intercommunicate, and a lower overflow-section provided with a discharge-pipe, and suction and discharge-pipes connecting the pump respectively with said upper and intermediate sections.

19. In a pasteurizing apparatus, the combination of a plurality of tanks for the sterilizing liquid, a transfer-pipe, a suction-pipe and a return-pipe on each tank, a valve common to the transfer-pipes, a second valve common to the suction-pipes and a third valve common to the return-pipes, a steam-jet pump communicating with said suction and return-pipes, a steam-supply pipe leading to said pump and containing a valve, and gear-connections between the valves operative from a single point on the apparatus to simultaneously set them, for the purpose set forth.

20. In a pasteurizing apparatus, the combination of a plurality of tanks for the sterilizing liquid, a transfer-pipe, a suction-pipe and a return pipe on each tank, a valve common to the transfer-pipes, a second valve common to the suction-pipes and a third valve common to the return-pipes, a heater and pump included in said suction and return-pipes, a steam-supply pipe leading to said heater and containing a valve, and means for setting the valves.

21. In a pasteurizing apparatus, the combination of a plurality of tanks for the sterilizing liquid, a transfer-pipe on each tank near its top, a suction-pipe on each tank near its bottom and a return-pipe on each tank still nearer its bottom, a valve common to the transfer-pipes, a second valve common to the suction-pipes and a third valve common to the return-pipes, a steam-jet pump communicating with said suction and return-pipes, and a steam-supply pipe leading to said pump and containing a valve.

22. In a pasteurizing apparatus, the combination of a plurality of tanks for the sterilizing liquid, a transfer-pipe on each tank near its top, a suction-pipe on each tank near its bottom and a return pipe on each tank still nearer its bottom, valves in the pipes for opening and closing communication between them, and a heater having communication with said suction and return pipes controllable through the valves therein, said valves containing ports operating to direct a relatively large quantity of the liquid from the heater into one tank while directing a relatively small quantity thereof into another tank for heating its contents.

23. In a pasteurizing apparatus, the combination with a tank for the sterilizing liquid, of a suction-pipe and a return-pipe communicating with said tank, a steam-jet pump having its suction and discharge sides connected with said pipes, respectively, a steam-supply pipe leading to said pump, an air-pressure-actuated valve in said pump, and a thermostat-device controlling the air-pressure action on said pump-valve.

24. In a pasteurizing apparatus, the combination with a tank for the sterilizing liquid, of a suction-pipe and a return-pipe communicating with said tank, a steam-jet pump having its suction and discharge sides connected with said pipes, respectively, a steam-supply pipe leading to said pump, a valve in said pump on a spring-pressed stem, a diaphragm-device with which said stem is connected, a valved air-pressure supply-pipe leading to the diaphragm-device, and a thermostat-device controlling the air-pressure valve.

25. In a pasteurizing apparatus, the combination with a tank for the sterilizing liquid, of a suction-pipe and a return-pipe communicating with said tank, a steam-jet pump having its suction and discharge sides connected with said pipes, respectively, a steam-supply pipe leading to said pump, an air-pressure-actuated valve in said pump, a thermostat-device controlling the air-pressure action on said pump-valve, and means for regulating the operation of the thermostat-device on said air-pressure valve.

26. In a pasteurizing apparatus, the combination with a tank for the sterilizing liquid, of a suction-pipe and a return-pipe communicating with said tank, a steam-jet pump having its suction and discharge sides connected with said pipes, respectively, a steam-supply pipe leading to said pump, a valve in said pump on a spring-pressed stem, a diaphragm-device with which said stem is connected, an air-pressure supply-pipe leading to the diaphragm-device and containing a spring-seated valve, a stem for opening the air-pressure valve, a thermostat-device in the course of circulation of the pump, a lever engaging at one end with the thermostat-device, a set-screw working in the opposite end of the lever against said stem of the air-pressure valve and carrying a pressure-setting finger, and a dial-device with which said finger coöperates.

27. In a pasteurizing apparatus, the combination of a plurality of tanks for the sterilizing liquid, a transfer-pipe, a suction-pipe and a return-pipe on each tank, a valve common to the transfer-pipes, a second valve common to the suction-pipes and a third valve common to the return-pipes, a steam-jet pump included in said suction and return pipes, a steam-supply pipe leading to said pump and containing a valve, gear-connections between the valves operative from a single point on the apparatus to simultaneously set them, an air-pressure-actuated valve in said pump, and a thermostat-device controlling the air-pressure action on said pump-valve.

28. In a pasteurizing apparatus, the combination of a plurality of tanks for the sterilizing liquid, a transfer-pipe, a suction-pipe and a return-pipe on each tank, a valve common to the transfer-pipes, a second valve common to the suction-pipes and a third valve common to the return pipes, a steam-jet pump included in said suction and return pipes, a steam-supply pipe leading to said pump and containing a valve, gear-connections between the valves operative from a single point on the apparatus to simultaneously set them, a valve in said pump on a spring-pressed stem, a diaphragm-device with which said stem is connected, a valved air-pressure supply-pipe leading to the diaphragm-device, and a thermostat-device controlling the air-pressure valve.

29. In a pasteurizing apparatus, the combination of a plurality of tanks for the sterilizing liquid, a transfer-pipe, a suction-pipe and a return pipe on each tank, a valve common to the transfer-pipes, a second valve common to the suction-pipes and a third valve common to the return-pipes, a steam-jet pump included in said suction and return pipes, a steam-supply pipe leading to said pump and containing a valve, gear-connections between the valves operative from a single point on the apparatus to simultaneously set them, an air-pressure-actuated valve in said pump, a thermostat-device in the course of circulation of the pump controlling the air-pressure action on said pump-valve, and means for regulating the operation of the thermostat-device on said air-pressure valve.

30. In a pasteurizing apparatus, the combination of a plurality of tanks for the sterilizing liquid, a transfer-pipe, a suction-pipe and a return-pipe on each tank, a valve common to the transfer-pipes, a second valve common to the suction-pipes and a third valve common to the return-pipes, a steam-jet pump included in said suction and return pipes, a steam-supply pipe leading to said pump and containing a valve, gear-connections between the valves operative from a single point on the apparatus to simultaneously set them, a valve in said pump on a spring-pressed stem, a diaphragm-device with which said stem is connected, an air-pressure supply-pipe leading to the diaphragm-device and containing a spring-seated valve, a stem for opening the air-pressure valve, a thermostat-device in the course of circulation of the pump, a lever engaging at one end with the thermostat-device, a set-screw working in the opposite end of the lever against said stem of the air-pressure valve and carrying a pressure-setting finger, and a dial-device with which said finger coöperates.

31. In a pasteurizing apparatus, the combination of a plurality of tanks, to the minimum number of three, for the sterilizing liquid, each having extending from it a transfer-pipe, a suction-pipe and a return-pipe, a valve common to the transfer-pipes, a second valve common to the suction-pipes and a third valve common to the return-pipes, a rotatable operating-rod having similar gear-connections with said valves adapted to turn them to the same extent and thereby set them with each complete rotation of said rod, a steam-jet pump having communication with said suction and return-pipes controlled through the valves therein, a steam-supply pipe leading to said pump, and a valve in said supply-pipe having a gear-connection with the operating-rod producing a different extent of turning the steam-valve by each complete rotation of said rod.

32. In a pasteurizing apparatus, the combination of a plurality of tanks, to the minimum number of three, for the sterilizing liquid, each having extending from it a transfer and overflow pipe and a suction-pipe and a return-pipe, a valve common to said first-named pipes, having a transfer-section and an overflow-section, a second valve common to the suction-pipes and a third valve common to the return-pipes, a rotatable operating-rod having similar gear-connections with said valves adapted to turn them to the same extent and thereby set them with each complete rotation of said rod, a steam-jet pump having communication with said suction and return-pipes controlled through the valves therein, a steam-supply pipe leading to said pump, and a valve in said supply-pipe having a gear-connection with the operating rod producing a different extent of turning the steam-valve by the complete rotation of said rod.

33. In a pasteurizing apparatus, the combination of a plurality of tanks, to the minimum number of three, for the sterilizing liquid, each having extending from it, near its top, a transfer and overflow pipe, from near its bottom a suction-pipe and from nearer its bottom a return-pipe, a valve common to said first-named pipes, a second valve common to the suction-pipes and a third valve common to the return-pipes, a rotatable operating rod having similar gear-connections with said valves adapted to turn them to the same extent and thereby set them with each complete rotation of said rod, a steam-jet pump having communication with said suction and return pipes controlled through the valves therein, a steam-supply pipe leading to said pump, and a valve in said supply-pipe having a gear-connection with the operating rod producing a different extent of turning the steam-valve by the complete rotation of said rod.

34. In a pasteurizing apparatus, the combination of a plurality of tanks, to the minimum number of three, for the sterilizing liquid, each having extending from it a trans fer-pipe, a suction-pipe and a return-pipe, a valve common to the transfer-pipes, a valve common to the suction-pipes and a valve common to the return-pipes, a rotatable operating rod having similar gear-connections with said valves adapted to turn them to the same extent and thereby set them with each complete rotation of said rod, a steam-jet pump having communication with said suction and return-pipes controlled through the valves therein, a steam-supply pipe leading to said pump, a valve in said pipe having a gear-connection with the operating-rod producing a different extent of turning the steam-valve by the complete rotation of said rod, and a water-circulating pump coöperating with the steam-jet pump.

35. A pasteurizing apparatus comprising, in combination, tanks 1, 2, 3, each having a transfer-pipe extending from its top portion, a suction-pipe extending from it toward its bottom and a return-pipe extending from it nearer its bottom, a valve common to the transfer-pipes, a second valve common to the suction-pipes and a third valve common to the return-pipes, a rotatable operating-rod having a six-to-one gear-connection with each of said valves, a steam-jet pump having communication with said suction and return pipes controlled through the valves therein, a steam-supply pipe leading to said pump, a valve in said supply-pipe having a four-to-one gear-connection with the operating-rod, a liquid-circulating pump coöperating with the steam-jet pump, a thermostat-device interposed in the course of the pump-circulated liquid, a valve in said jet-pump, and an air-pressure-actuated diaphragm-device controllably connected with the jet-pump valve and having a pressure-shut-off valve in operative connection with the thermostat-device, all substantially as and for the purpose set forth.

JOHN T. H. PAUL.

In presence of—
  J. H. LANDES,
  R. A. SCHAEFER.